Oct. 13, 1931.   E. A. MACK   1,827,325
SUSPENSION CLAMP
Filed Dec. 26, 1929
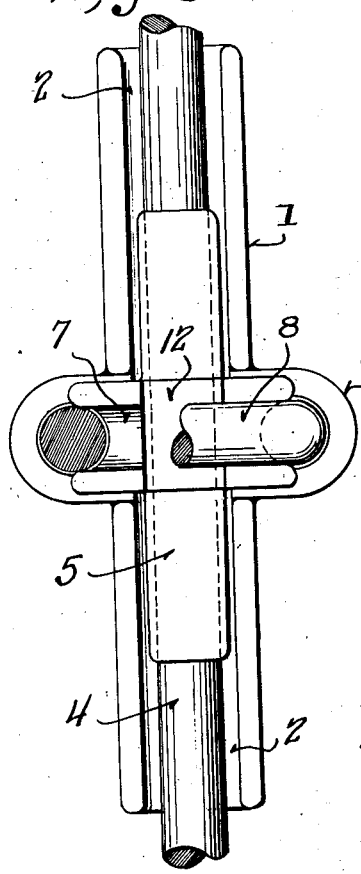
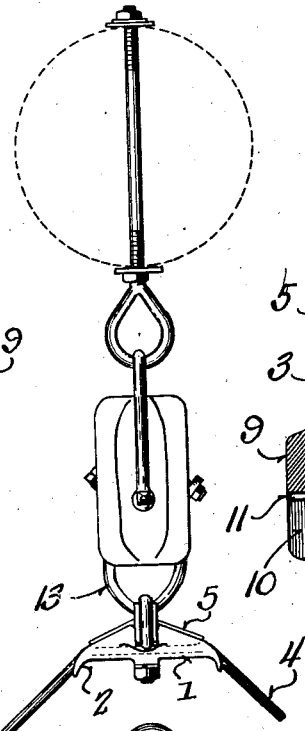
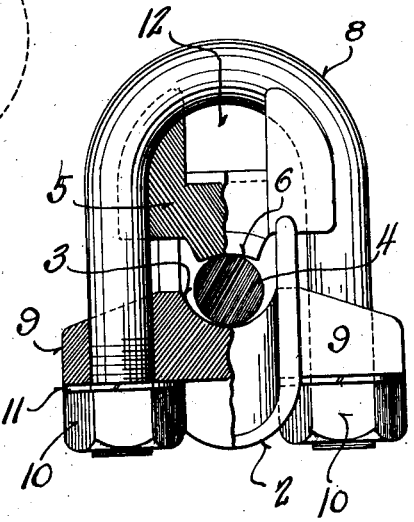
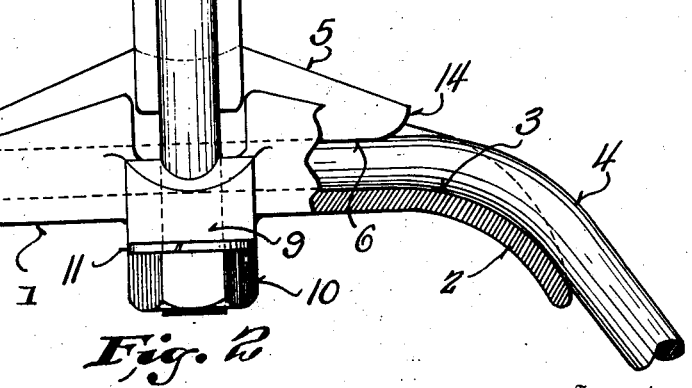
Inventor
Edward A. Mack
By Arthur R. Woolfolk
Attorney Patented Oct. 13, 1931

1,827,325

UNITED STATES PATENT OFFICE

EDWARD A. MACK, OF HUNTINGTON, WEST VIRGINIA, ASSIGNOR TO LINE MATERIAL COMPANY, OF SOUTH MILWAUKEE, WISCONSIN, A CORPORATION OF DELAWARE

SUSPENSION CLAMP

Application filed December 26, 1929. Serial No. 416,340.

This invention relates to suspension clamps.

Objects of this invention are to provide a novel form of suspension clamp which has a minimum number of parts, which is so constructed that a single U-bolt performs the dual function of both supporting the body portion of the clamp and also of holding the two portions of the clamp together.

Further objects are to provide a suspension clamp which may be made with the utmost cheapness, which is of very strong construction, which is compact, and which is easy to assemble and disassemble.

An embodiment of the invention is shown in the accompanying drawings, in which:

Figure 1 is a view showing the clamp in place supported by one form of support or suspension member.

Figure 2 is a side elevation of the clamp drawn to an enlarged scale and with parts broken away.

Figure 3 is a plan view of the clamp.

Figure 4 is an end elevation of the clamp with parts broken away.

Referring to the drawings, it will be seen that the clamp consists of a main body portion 1, which is provided with downturned ends 2, and which has a channeled or grooved upper portion 3 within which the cable 4 is carried, the cable extending to any suitable device.

The clamp is provided with an auxiliary member 5, which is provided with a slightly channeled face 6 directed towards the channeled face 3 of the main body portion. This auxiliary member 5 is also provided with an exterior channel 7 extending transversely of the auxiliary member, as shown most clearly in Figure 3. This outer channel receives the arched portion of the U-bolt 8. The arms of the U-bolt extend through apertured ears or lugs 9 formed integrally with the main body portion 1 of the clamp. The ends of the U-bolt are threaded and receive the clamping nuts 10, preferably split washers 11 being interposed between the nuts 10 and the ears 9, as shown in Figures 2 and 4.

The central portion of the auxiliary member 5 is cut out, as indicated at 12 in Figure 4, so as to receive the supporting member 13, by means of which the clamp is suspended. The supporting member 13 may take any form and in reality forms no portion of this invention. In the form shown merely for the purpose of illustration, an insulator type of support has been used. Whatever type of support is used, the supporting member corresponding to the member 13 passes through the aperture 12 of the auxiliary member 5 and thus loops through the U-bolt 8, so that the supporting member 13 directly supports the suspension clamp through the medium of the U-bolt.

In using the clamp it will be readily apparent that it is a very simple matter to position the cable 4 within the channel 3 of the body portion 1, and thereafter position the auxiliary member 5 in contact with the cable 4. The U-bolt is then slipped into place and the nuts 10 screwed upon the ends or arms of the U-bolt, thus drawing the auxiliary member 5 towards the main or body portion 1, and thereby clamping the cable tightly between the body portion 1 and the auxiliary member 5.

It is to be noted from reference to Figure 2 that there is no chance of cutting or damaging the cable by means of the clamp, as the cable is received in the channeled portions of the clamp, and as the ends of the body portion 1 are rounded, the ends of the auxiliary member 5 being also rounded as indicated at 14 in Figure 2.

It will be seen that the clamp consists essentially of only three main parts, namely, the body portion 1, the auxiliary member 5, and the U-bolt 8. Also that these three parts are of very simple shape and may be most easily produced. The suspension clamp, therefore, may be very cheaply produced.

It is to be noted further that the U-bolt performs the double function of holding the parts of the clamp in firm engagement with the cable and also of supporting the suspension clamp.

Further than this, it is obvious that the pressure applied by the clamp to the cable is not localized, but is distributed over a material portion of the cable, and thus there is no chance of cutting the cable.

It is to be distinctly understood that the expression "cable" as used in this disclosure is not to be limited to the technical meaning of the word only, but is to be interpreted as applying to any member having a similar function.

Although this invention has been described in considerable detail, it is to be understood that such description is intended as illustrative rather than limiting, as the invention may be variously embodied and is to be interpreted as claimed.

I claim:

1. A suspension clamp comprising a body portion and an auxiliary portion adapted to receive between them a cable, and a U-bolt for drawing said body portion and auxiliary member towards each other to clamp the cable, said U-bolt having a portion adapted to be engaged by a support, and said auxiliary member being provided with means facilitating the engagement of said U-bolt by a support whereby the clamp is held in clamped position and supported by said U-bolt.

2. A suspension clamp adapted to receive a cable and comprising a channeled body portion within which the cable is adapted to fit, an auxiliary member cooperating with said body portion to hold said cable in place, said auxiliary member having a channel at right-angles to said first mentioned channel, and a U-bolt positioned within said last mentioned channel and having its ends passing through said body portion, said auxiliary member having a cut out across which said U-bolt extends.

3. A suspension clamp adapted to receive a cable comprising a body portion having a longitudinally extending channel and having a pair of laterally projecting apertured ears, an auxiliary member having a portion adapted to clamp the cable within the channel of said body portion and having a laterally extending channeled portion, a U-bolt having a curved yoke portion seated within said last mentioned channeled portion and having its arms projecting through the apertured ears of said body portion, and nuts screwed upon the arms of said U-bolt, said auxiliary member having an aperture beneath the curved portion of said U-bolt.

4. A suspension clamp comprising a body portion having a longitudinally extending channeled part provided with outward turned ends and having laterally projecting apertured ears, an auxiliary member having a longitudinally extending portion located opposite the longitudinally extending part of the body portion, said auxiliary member having a laterally extending portion provided with a curved channel, a U-bolt having a curved yoke portion seated within the curved channel and having its arms projecting through the apertured ears of said body portion, and nuts screwed upon the arms of said U-bolt, said auxiliary member having a notch formed in the laterally extending portion for the reception of a support.

In testimony whereof, the signature of the inventor is affixed hereto.

EDWARD A. MACK.